US011899660B2

(12) United States Patent
Tummala et al.

(10) Patent No.: US 11,899,660 B2
(45) Date of Patent: Feb. 13, 2024

(54) SYSTEMS AND METHODS FOR OPTIMIZED CLOUD DATABASE QUERY EXECUTION

(71) Applicant: JPMORGAN CHASE BANK, N.A., New York, NY (US)

(72) Inventors: Narayana R Tummala, Fulshear, TX (US); Marco Pistoia, Amawalk, NY (US); Pranav Deshpande, Jersey City, NJ (US); Elvir Azanli, Union, NJ (US); Joseph W. Ligman, Weston, CT (US); Frank Schaffa, Hartsdale, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 16 days.

(21) Appl. No.: 17/813,260

(22) Filed: Jul. 18, 2022

(65) Prior Publication Data
US 2024/0020303 A1    Jan. 18, 2024

(51) Int. Cl.
*G06F 16/2453* (2019.01)
*G06F 16/22* (2019.01)
*G06F 40/177* (2020.01)

(52) U.S. Cl.
CPC ........ *G06F 16/2453* (2019.01); *G06F 16/221* (2019.01); *G06F 16/2282* (2019.01); *G06F 40/177* (2020.01)

(58) Field of Classification Search
None
See application file for complete search history.

(56) References Cited

U.S. PATENT DOCUMENTS

| | | | |
|---|---|---|---|
| 2022/0318223 A1* | 10/2022 | Ahluwalia | G06F 16/2282 |
| 2023/0091845 A1* | 3/2023 | Buchmann | G06F 16/258 707/769 |
| 2023/0177043 A1* | 6/2023 | Jenuwine | G06F 16/258 707/609 |

* cited by examiner

*Primary Examiner* — Irene Baker
(74) *Attorney, Agent, or Firm* — GREENBERG TRAURIG LLP (57) ABSTRACT

A method for writing data to a cloud-based database for optimized cloud-based database query execution may include a table writer computer program executed by a local electronic device: (1) receiving table data comprising rows and columns, a schema for the table, and a primary-key for the table; (2) creating a footer for the table, the footer comprising the schema and the primary-key; (3) sorting the rows of the table data using the primary-key; (4) dividing the sorted columns of the table data into a plurality of datapages based on a datapage size; (5) identifying sparse indices for each datapage, wherein the sparse indices comprising a minimum value, a maximum value, a starting row index, an ending row index for each datapage; (6) writing each datapage to cloud storage; (7) inserting the sparse indices into the footer for the table data; and (8) writing the footer to cloud storage.

20 Claims, 5 Drawing Sheets

| Row Group #0 | | RG #1 | #K | Footer |
|---|---|---|---|---|

Column #0 (int32) — Data Page #0, #1

Column #1 (int64) — Data Page #0, #1, #2

Column #2 (string) — Data Page #0, #1, #2, #3, #4, #5

Data Page Sparse Indices | Entitlements | Schema | Meta Data

SYSTEMS AND METHODS FOR OPTIMIZED CLOUD DATABASE QUERY EXECUTION

BACKGROUND OF THE INVENTION

1. Field of the Invention

Embodiments are generally related to systems and methods for optimized cloud-based database query execution.

2. Description of the Related Art

Many organizations store large quantities of data in the cloud with cloud providers. Due to the way that the data is stored, organizations are required to retrieve large datasets in order to query just a portion of the dataset. This is not only slow and inefficient, but due to pricing models that cloud providers use, is very expensive.

SUMMARY OF THE INVENTION

Systems and methods for optimized cloud-based database query execution are disclosed. In one embodiment, a method for writing data to a cloud-based database for optimized cloud-based database query execution may include: (1) receiving, by a table writer computer program executed by a local electronic device, table data comprising a plurality of rows and a plurality of columns, a schema for the table, and a primary-key for the table; (2) creating, by the table writer computer program, a footer for the table, the footer comprising the schema and the primary-key; (3) sorting, by the table writer computer program, the rows of the table data using the primary-key; (4) dividing, by the table writer computer program, the sorted columns of the table data into a plurality of datapages based on a datapage size; (5) identifying, by the table writer computer program, sparse indices for each datapage, wherein the sparse indices comprising a minimum value, a maximum value, a starting row index, an ending row index for each datapage; (6) writing, by the table writer computer program, each datapage to cloud storage; (7) inserting, by the table writer computer program, the sparse indices into the footer for the table data; and (8) writing, by the table writer computer program, the footer to cloud storage.

In one embodiment, the table writer computer program may also receive entitlements data for access to data in the table data and may write the entitlements data to the footer, wherein the entitlements data may identify individuals or roles that are authorized to access the data in the table data.

In one embodiment, the primary-key may identify a value in a column or in a plurality of columns.

In one embodiment, each datapage may represent a basic unit of data that is transferred into and out of the cloud storage.

In one embodiment, the method may also include receiving, by the table writer computer program, modified data for data in one of the plurality of datapages, and writing, by the table writer computer program, the modified data to a new row-group in the datapage. The new row-group may be returned with the one of the plurality of datapages.

According to another embodiment, a method for fetching data from a cloud-based database for optimized cloud-based database query execution may include: (1) receiving, by a table reader computer program executed by a local electronic device, a data query request from a user for data that is stored in cloud storage, the data query request comprising a row filtering expression and the cloud storage comprises table data having a plurality of datapages; (2) retrieving, by the table reader computer program, a footer for a table data associated with the data stored in cloud storage; (3) identifying, by the table reader computer program, one of the plurality of datapages comprising data responsive to the row filtering expression based on the footer; (4) retrieving, by the table reader computer program, the identified datapage from cloud storage; (5) assembling, by the table reader computer program, matching rows from the datapage; and (6) returning, by the table reader computer program, the assembled matching rows to the local electronic device.

In one embodiment, the footer may include a sparse index comprising a minimum value, a maximum value, a starting row index, an ending row index for each of the plurality of datapages.

In one embodiment, the row filtering expression may be within the sparse index of the identified datapage.

In one embodiment, the method may also include retrieving, by the table reader computer program, entitlement data for the datapage from the footer, wherein the entitlements data identifies individuals or roles that are authorized to access the data in the table data, and determining, by the table reader computer program, that the user is entitled to access the data by comparing the user's entitlements to the retrieved entitlement data.

In one embodiment, the method may also include identifying, by the table reader computer program, a new row-group in the datapage comprising modified data for the identified datapage, and returning, by the table reader computer program, the new row-group with the identified datapage.

According to another embodiment, a non-transitory computer readable storage medium may include instructions stored thereon, which when read and executed by one or more computer processors, cause the one or more computer processors to perform steps including: (1) receiving table data comprising a plurality of rows and a plurality of columns, a schema for the table data, and a primary-key for the table data; (2) creating a footer for the table data, the footer comprising the schema and the primary-key; (3) sorting the rows of the table data using the primary-key; (4) dividing the sorted columns of the table data into a plurality of datapages based on a datapage size; (5) identifying sparse indices for each datapage, wherein the sparse indices comprising a minimum value, a maximum value, a starting row index, an ending row index for each datapage; (6) writing each datapage to cloud storage; (7) inserting the sparse indices into the footer for the table data; and (8) writing the footer to cloud storage.

In one embodiment, the instructions may also cause the one or more computer processors to perform steps including receiving entitlements data for access to data in the table data, wherein the entitlements data identifies individuals or roles that are authorized to access the data in the table data, and writing the entitlements data to the footer.

In one embodiment, the primary-key may identify a value in a column or in a plurality of columns.

In one embodiment, each datapage may represent a basic unit of data that is transferred into and out of the cloud storage.

In one embodiment, the instructions may also cause the one or more computer processors to perform steps including receiving modified data for data in one of the plurality of datapages, and writing the modified data to a new row-group in the datapage. The new row-group may be returned with the one of the plurality of datapages.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate generally to systems and methods for optimized cloud-based database query execution.

Figure 1:
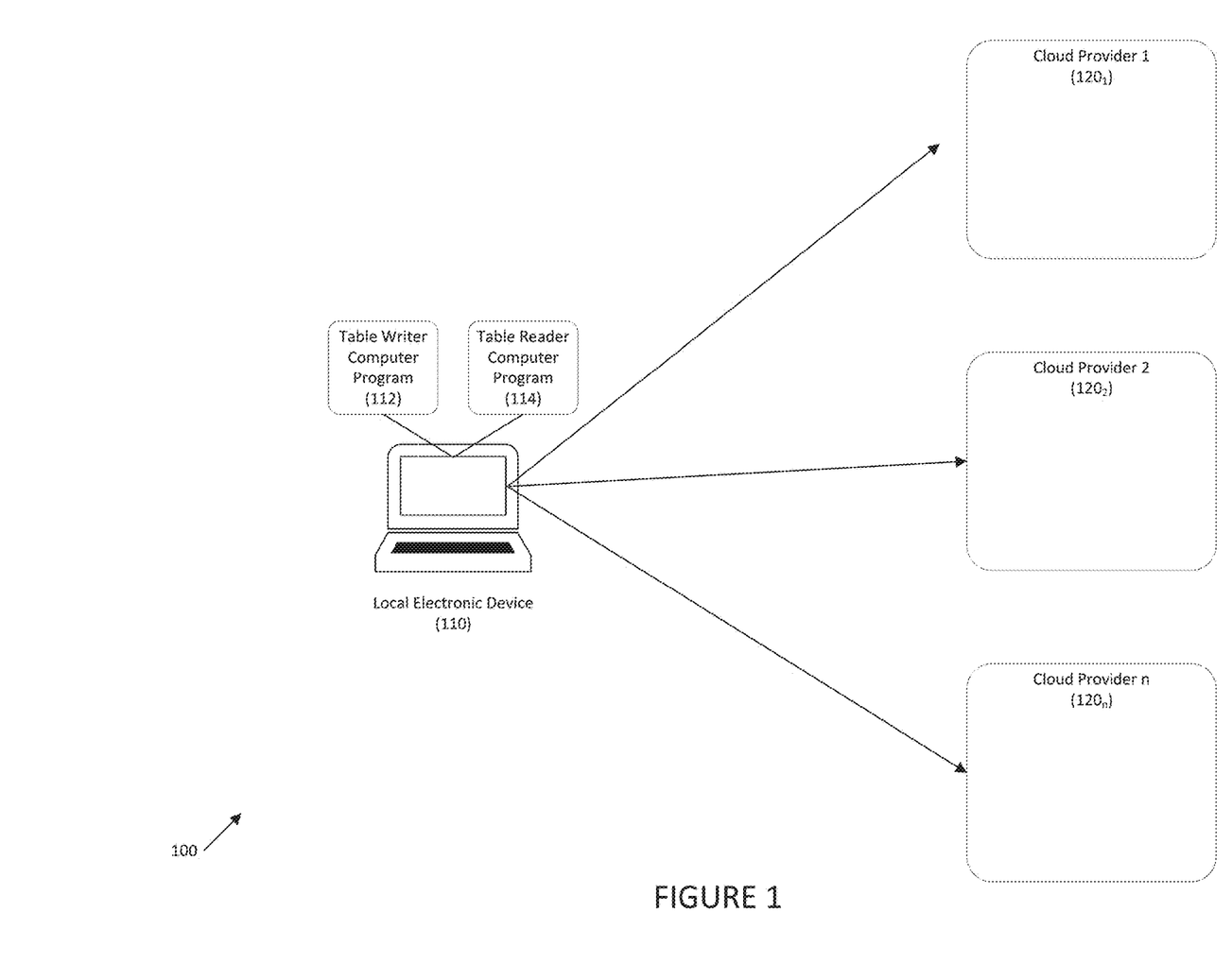
FIG. 1 depicts a system for optimized cloud-based database query execution according to an embodiment.

Referring to FIG. 1, a system for optimized cloud-based database query execution is disclosed according to an embodiment. System 100 may include local electronic device 110, which may be any suitable electronic device, including computers (e.g., workstations, desktops, laptops, tablet computers, etc.), smart devices (e.g., smartphones, Internet of Things appliances, etc.), etc. Local electronic device 110 may execute computer program or applications, such as table writer computer program 112 and table reader computer program 114, may be configured to store and/or access data stored in one or more cloud provider 120 (e.g., $120_1$, $120_2$, ... $120_n$).

Cloud providers 120 may be any provider of cloud storage services. Cloud providers 120 may store data in any suitable manner and/or format. For example, the data stored may be structured or unstructured, encrypted or unencrypted, in file(s) of any size, etc.

In one embodiment, entitlements data, such as the roles and/or identifiers that may have access to the data in the table, may be stored in one or more database (not shown). Entitlements data may be written to the footer and may restrict access to the data to users and/or systems that are entitled to access the data in the table.

Figure 2:
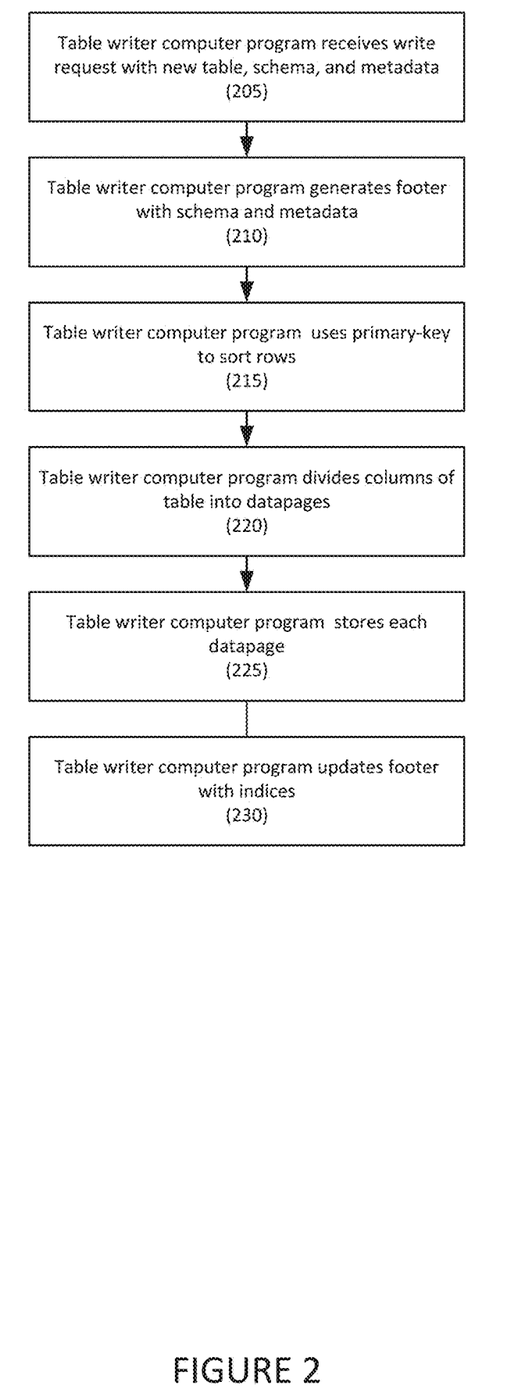
FIG. 2 depicts a method for writing data to cloud-based object storage for optimized cloud-based database query execution according to an embodiment.

Referring to FIG. 2, a method for writing data to cloud-based object storage for optimized cloud-based database query execution according to an embodiment.

In step 205, a table writer computer program executed by a local electronic device may receive a table to write to cloud-based storage. In addition, the table may be provided with a schema for the table and metadata for the table. In embodiments, the metadata may include a primary-key and also a list of columns that are most frequently accessed for the table.

In one embodiment, entitlements data, such as the roles and/or identifiers that may have access to the data in the table, may also be received.

The primary-key may be selected based on the value in a column that is most likely to be retrieved on. The primary-key may identify a single column, or it may identify a combination of columns (e.g., column1-key or column1-key:column2-key). For columns that are strings, the first few characters may be used as the primary-key (e.g., for a string value "San Francisco," the first character ("S") may be used). For integers, the first digit of the number may be used as the primary-key.

For example, for multiple columns, if queries for the number of orders by a "state" and "county" are most frequently received, then the primary-key may be defined as the combination of two columns "state" and "county."

In step 210, the table writer computer program may create a footer for the table. The footer may include the indices, entitlements, the schema, and the metadata. The metadata may include the primary-key.

In step 215, the table writer computer program may use the primary-key to sort the rows of the table. For example, if the primary-key is a number, the rows may be sorted numerically. If the primary-key is a letter, the rows may be sorted alphabetically. If the primary-key includes a plurality of letters and/or numbers, the rows may be sorted by a first key and then by a second key. For example, a single combined value based on the definition of the multi-column primary-key may be used for sorting purposes and then used to sort the rows.

Each row-group may be a group of rows, and each row-group may have a number of rows. The number of rows in each row-group may be the same; in another embodiment, the number of rows may vary by row-group. In one embodiment, the number of rows in each row-group may vary based on, for example, the cloud provider, the size of data in a typical row based on the schema definition, etc.

In step 220, the table writer computer program may then divide the columns of the sorted rows into a plurality of datapages. Each datapage may represent the basic unit of data that is transferred into and out of the cloud storage. In one embodiment, the maximum size of the datapage may be set such that read and write operations are optimized based on the functional characteristics of the cloud storage system.

In one embodiment, maximum size of the datapage may be set using an API provided by the cloud provider, or it may be configured manually.

For example, a datapage may have a size of 10 megabytes. Any suitable datapage size may be used as is necessary and/or desired.

In one embodiment, the table writer computer program may set the starting the ending rows indices for each datapage and the minimum and maximum values in each datapage and may store these indices in the footer as sparse indices to aid during read operations. These values and indices may be used to identify one or more datapage to retrieve.

In step 225, the table writer computer program may write each datapage to cloud storage as a compressed Apache Arrow vector. In the course of writing the datapages, the table writer computer program may identify statistics for the datapage, such as the sparse indices, discussed above.

In step 230, the table writer computer program may update the footer in the cloud provider storage and may update the sparse indices, the entitlements, the schema, and the metadata as needed. The table writer computer program may then return a status, such as successful completion, unsuccessful completion, etc. to the user electronic device.

Figure 3:
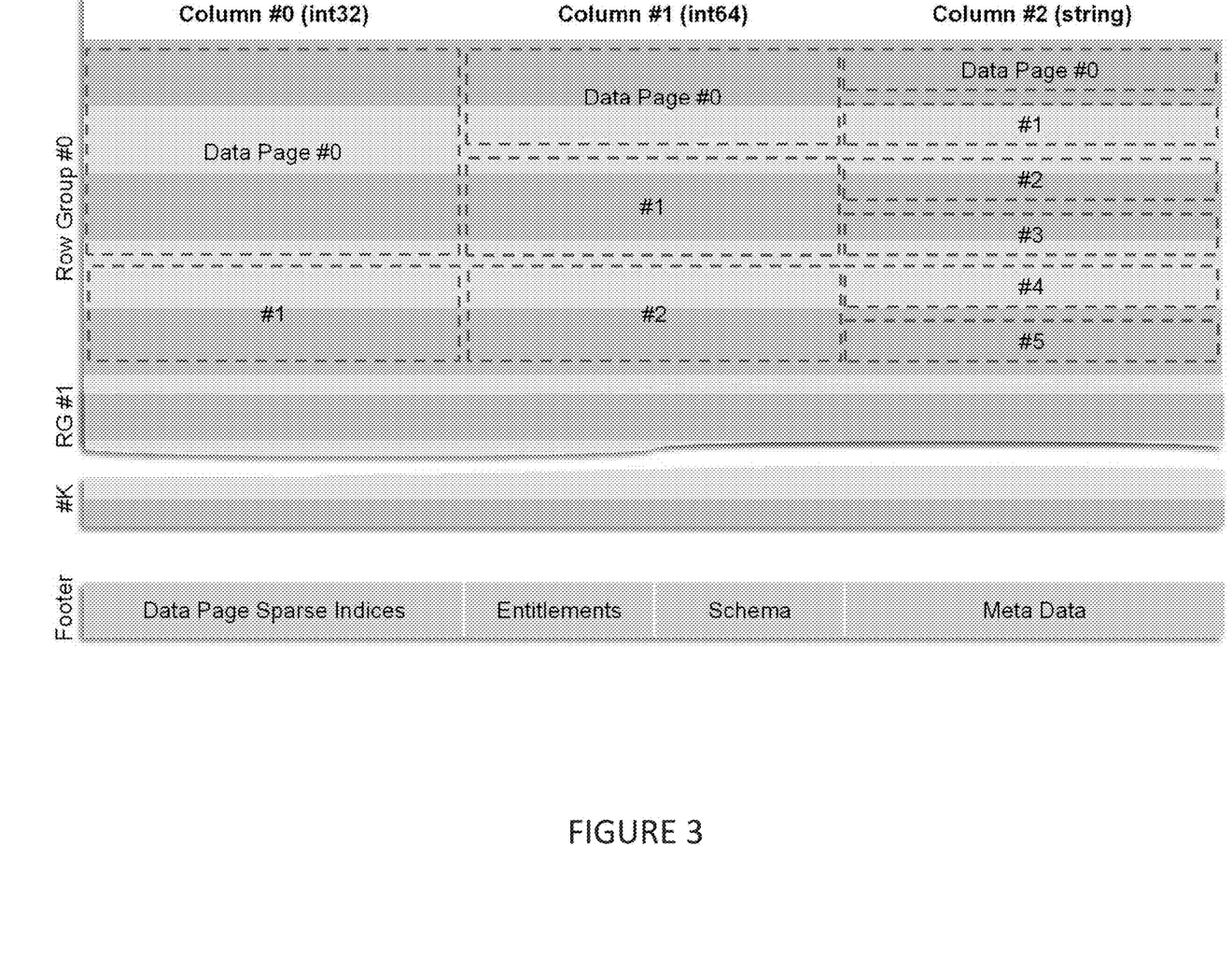
FIG. 3 depicts an exemplary table file format according to an embodiment.

An exemplary table file format is provided in FIG. 3. In embodiments, a table may be divided into row-groups (e.g., Row-Group #0, RG #1, etc.), and each row-group may be further sub-divided into one or many data-pages for each column. Each column of data may have a particular format, such as integer 32, integer 64, string, etc.

Each row-group may be sorted on a primary-key that is configured as an attribute of the schema. The primary-key may not be unique within or across row-groups.

Each row-group may be further divided into a plurality of datapages (e.g., datapage #0, datapage #1, datapage #2, etc.). Each datapage is the basic unit of data transferred in and out of underlying storage system.

The footer may further store entitlement data, such as role-based, column based, and/or cell(s) based entitlements. In embodiments, the entitlements may identify one or more user roles or attributes that are authorized to access the datapages. The roles may be defined by the data owner or globally across an organization, and each role may specify a list of criteria for filtering rows and masking columns. For example: Basic User Role (e.g., most restrictive; access to geofenced rows only and all sensitive data is masked); Admin Role (e.g., very limited restrictions, if any); Programmatic Producer Role (e.g., less restrictive; tied to a function); Interactive Producer Role (more restrictive than the Programmatic Producer Role); and Privileged Consumer Roles (e.g., multiple roles as needed, restricting access at various levels of data hierarchy).

In one embodiment, the data owner or similar may update the entitlements as is necessary and/or desired, and independently of the data.

The footer may further store a schema for the table file, as well as metadata, such as an indication that adjustments are present in the table file. In embodiments, the schema may include column names and column types (e.g., int32, int64, string, etc.). It may further include the primary-key that may be used to sort data in individual row-groups, a list of protected columns, such as columns that may contain sensitive data (e.g., social security numbers, account numbers, etc.) that certain users may not be entitled to access, and flags, such as a flag that indicates whether the data is geofenced for regulatory compliance. The flag may identify column(s) with this information and any mapping to human resources records. For example, when a United States-based user attempts to access such data, embodiments will not return data that is restricted to China.

In one embodiment, data in the data table that has been written to the cloud storage may be modified as necessary and/or desired. For example, the modifications may be written as a new row-group.

Figure 4:
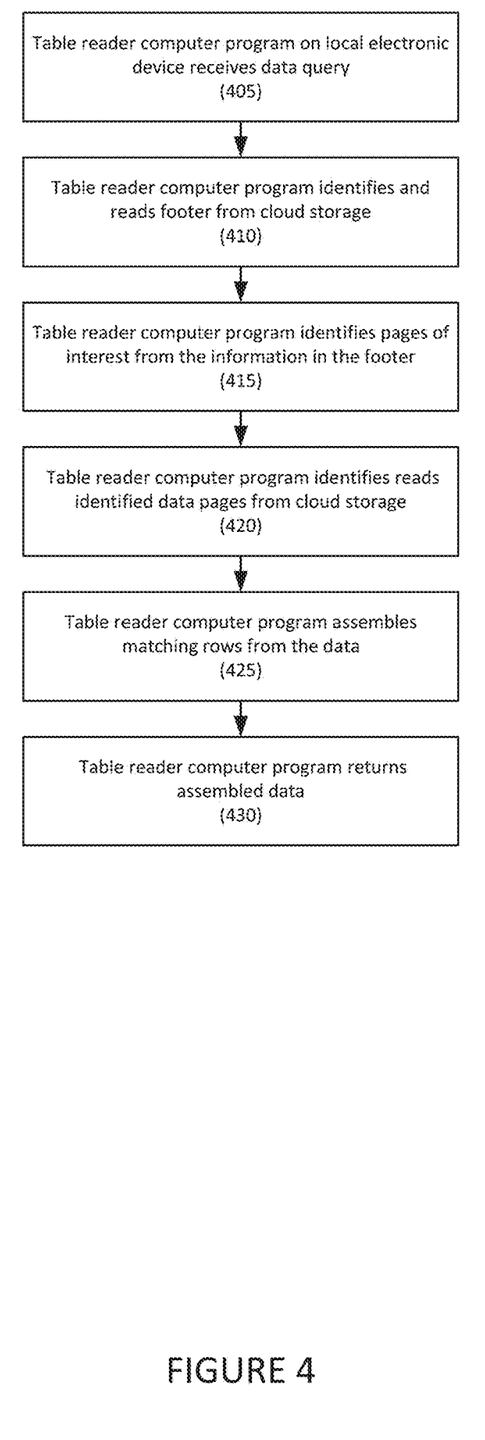
FIG. 4 depicts a method for fetching data from a cloud-based database for optimized cloud-based database query execution according to an embodiment.

Referring to FIG. 4, a method for fetching data from a cloud-based database for optimized cloud-based database query execution according to an embodiment.

In step 405, a table reader computer program executed by a local electronic device may receive a data query request from a user. The request may include, for example, a UserID for the user and a row filtering expression. For example, the table reader computer program may receive a statement and then may parse the statement into individual sub-queries, or row filtering expressions, with one row filtering expression for each of the tables. The row filtering expressions may identify data of interest to retrieve, such as a range of values.

In step 410, the table reader computer program may identify a footer for a table file stored with a cloud provider, and may read the footer. The footer may include datapage sparse indices for a plurality of datapages, entitlements, schema, and metadata.

In step 415, the table reader computer program may identify datapages of interest in the table file for all columns using the sparse indices and the row filtering expression. For example, using the row filtering expression, the table reader computer program may identify one or more datapages to retrieve using the minimum value, a maximum value, a starting row index, an ending row index, and entitlements.

In one embodiment, if modifications to the data are available in separate row-groups, the table reader computer program may determine whether to retrieve the original data and the modifications to that data and apply the modifications to the written data, or to retrieve the modifications only. In one embodiment, the row-groups with modifications may be retrieved whenever the datapage meeting the indices is retrieved.

In step 420, the table reader computer program may read the identified datapages from cloud storage. For example, the table reader computer program may use multiple object GETs in parallel to retrieve the datapages.

In step 425, the table reader computer program may assemble matching rows from the data. For example, the table reader computer program may filter the rows in the retrieved datapage(s) and may mask any columns from display based on the row filtering expression and the entitlements (e.g., based on the role associated with the UserID).

In one embodiment, the table reader computer program may verify that the user is entitled to access the data. For example, the table reader computer program compare the user's entitlements, which may be received in the request, to entitlements data in the footer of the table.

In step 430, the table reader computer program may return assembled data by, for example streaming the response in Apache Arrow Vector format.

Figure 5:
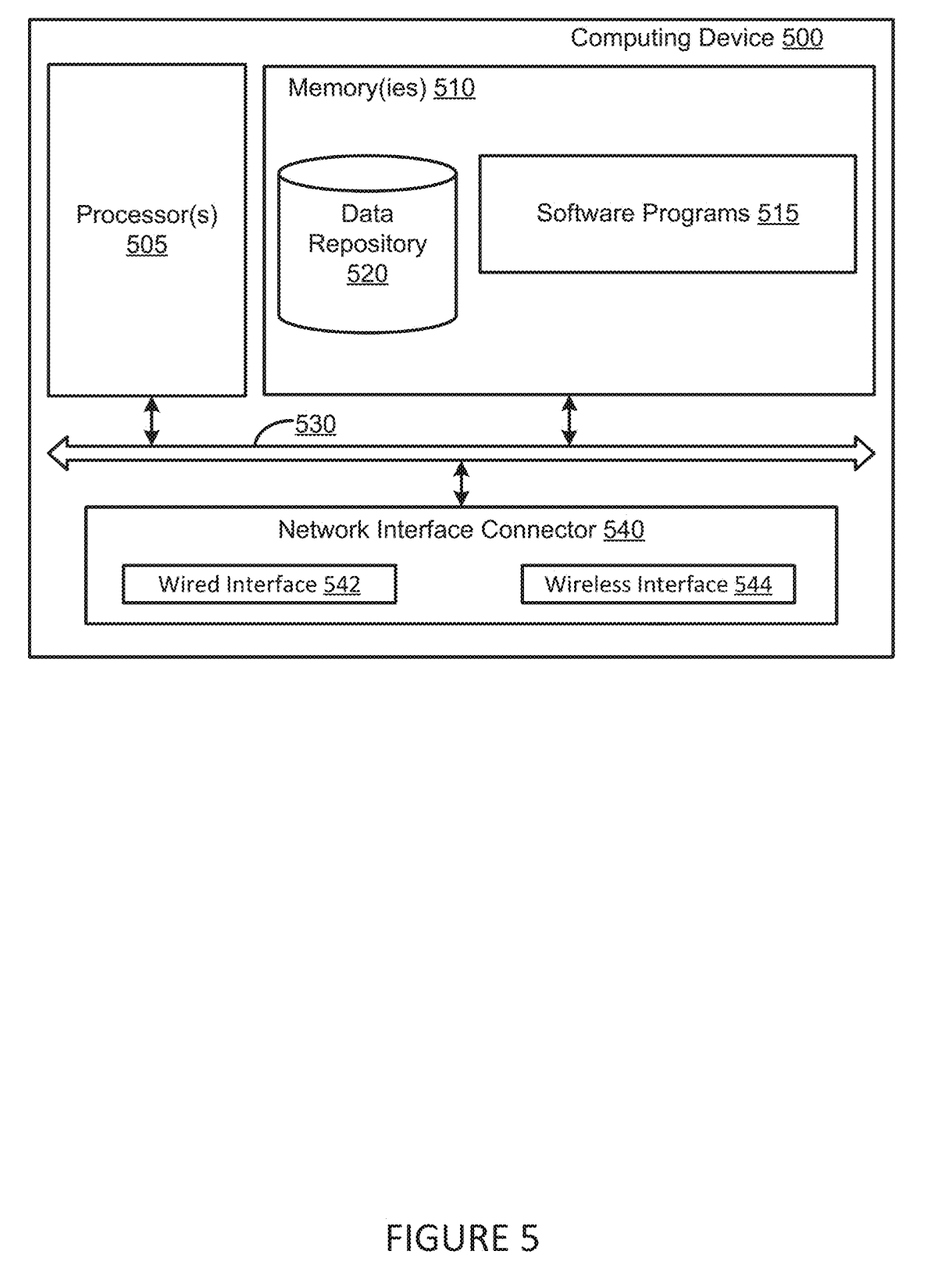
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above.

Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for writing data to a cloud-based database for optimized cloud-based database query execution, comprising:
   receiving, by a table writer computer program executed by a local electronic device, table data comprising a plurality of rows and a plurality of columns, a schema for the table data, and a primary-key for the table data;
   creating, by the table writer computer program, a footer for the table data, the footer comprising the schema and the primary-key;
   sorting, by the table writer computer program, the rows of the table data using the primary-key;
   dividing, by the table writer computer program, columns of the sorted rows of the table data into a plurality of datapages based on a datapage size;
   identifying, by the table writer computer program, sparse indices for each datapage, wherein the sparse indices comprise a minimum value, a maximum value, a starting row index, an ending row index for each datapage;
   writing, by the table writer computer program, each datapage to cloud storage;
   inserting, by the table writer computer program, the sparse indices into the footer for the table data; and
   writing, by the table writer computer program, the footer to cloud storage.

2. The method of claim 1, wherein the table writer computer program further receives entitlements data for access to data in the table data and writes the entitlements data to the footer, wherein the entitlements data identifies individuals or roles that are authorized to access the data in the table data.

3. The method of claim 1, wherein the primary-key identifies a value in a column.

4. The method of claim 1, wherein the primary-key identifies a value in the plurality of columns.

5. The method of claim 1, wherein each datapage represents a basic unit of data that is transferred into and out of the cloud storage.

6. The method of claim 1, further comprising:
   receiving, by the table writer computer program, modified data for data in one of the plurality of datapages; and
   writing, by the table writer computer program, the modified data to a new row-group in the datapage;
   wherein the new row-group is returned with the one of the plurality of datapages.

7. The method of claim 1, wherein the table data comprises a table.

8. A method for fetching data from a cloud-based database for optimized cloud-based database query execution, comprising:
   receiving, by a table reader computer program executed by a local electronic device, a data query request from a user for data that is stored in cloud storage, the data query request comprising a row filtering expression and the cloud storage comprises table data having a plurality of datapages;
   retrieving, by the table reader computer program, a footer for table data associated with the data stored in cloud storage;
   identifying, by the table reader computer program, one of the plurality of datapages comprising data responsive to the row filtering expression based on the footer;
   retrieving, by the table reader computer program, the identified datapage from cloud storage;
   assembling, by the table reader computer program, matching rows from the datapage; and
   returning, by the table reader computer program, the assembled matching rows to the local electronic device.

9. The method of claim 8, wherein the footer comprises a sparse index comprising a minimum value, a maximum value, a starting row index, an ending row index for each of the plurality of datapages.

10. The method of claim 9, wherein the row filtering expression is within the sparse index of the identified datapage.

11. The method of claim 8, further comprising:
retrieving, by the table reader computer program, entitlements data for the datapage from the footer, wherein the entitlements data identifies individuals or roles that are authorized to access the data in the table data; and
determining, by the table reader computer program, that the user is entitled to access the data by comparing the entitlements of the user to the retrieved entitlements data.

12. The method of claim 8, further comprising:
identifying, by the table reader computer program, a new row-group in the datapage comprising modified data for the identified datapage; and
returning, by the table reader computer program, the new row-group with the identified datapage.

13. The method of claim 12, wherein the table data comprises a table.

14. A non-transitory computer readable storage medium, including instructions stored thereon, which when read and executed by one or more computer processors, cause the one or more computer processors to perform steps comprising:
receiving table data comprising a plurality of rows and a plurality of columns, a schema for the table data, and a primary-key for the table data;
creating a footer for the table data, the footer comprising the schema and the primary-key;
sorting the rows of the table data using the primary-key;
dividing columns of the sorted rows of the table data into a plurality of datapages based on a datapage size;
identifying sparse indices for each datapage, wherein the sparse indices comprise a minimum value, a maximum value, a starting row index, an ending row index for each datapage;
writing each datapage to cloud storage;
inserting the sparse indices into the footer for the table data; and
writing the footer to cloud storage.

15. The non-transitory computer readable storage medium of claim 14, further including instructions stored thereon, which when read and executed by one or more computer processors, cause the one or more computer processors to perform steps comprising:
receiving entitlements data for access to data in the table data, wherein the entitlements data identifies individuals or roles that are authorized to access the data in the table data; and
writing the entitlements data to the footer.

16. The non-transitory computer readable storage medium of claim 14, wherein the primary-key identifies a value in a column.

17. The non-transitory computer readable storage medium of claim 14, wherein the primary-key identifies a value in the plurality of columns.

18. The non-transitory computer readable storage medium of claim 14, wherein each datapage represents a basic unit of data that is transferred into and out of the cloud storage.

19. The non-transitory computer readable storage medium of claim 14, further including instructions stored thereon, which when read and executed by one or more computer processors, cause the one or more computer processors to perform steps comprising:
receiving modified data for data in one of the plurality of datapages; and
writing the modified data to a new row-group in the datapage;
wherein the new row-group is returned with the one of the plurality of datapages.

20. The non-transitory computer readable storage medium of claim 14, wherein the table data comprises a table.

* * * * *